United States Patent [19]

Sawyer

[11] 3,710,946
[45] Jan. 16, 1973

[54] WELDED CONNECTORS FOR TUBULAR SEPARATOR MODULE

[75] Inventor: Ernest Robert Sawyer, Solana Beach, Calif.

[73] Assignee: Calgon Corporation, Pittsburgh, Pa.

[22] Filed: May 18, 1971

[21] Appl. No.: 144,463

[52] U.S. Cl. ................. 210/321, 210/336, 210/433
[51] Int. Cl. ........................................... B01d 31/00
[58] Field of Search ..................... 210/321, 336, 433

[56] References Cited

UNITED STATES PATENTS 2,353,489  7/1944  Newcomb ........................... 210/321
3,485,374  12/1969  Manjikian et al ..................... 210/321

*Primary Examiner*—Frank A. Spear, Jr.
*Attorney*—William L. Krayer and Herbert J. Zeh, Jr.

[57] ABSTRACT

A unitary molded header element is disclosed accommodating a plurality of fittings for internally coated reverse osmosis or ultrafiltration tubes. A turn-around channel is provided for each pair of tubes inserted in the header. The turn-around channel is integral in the mold; it may be sealed from the butt end with a plug which may be sonic welded to the header. The header enables assembly of a unique module.

4 Claims, 7 Drawing Figures

PATENTED JAN 16 1973
3,710,946
SHEET 1 OF 4
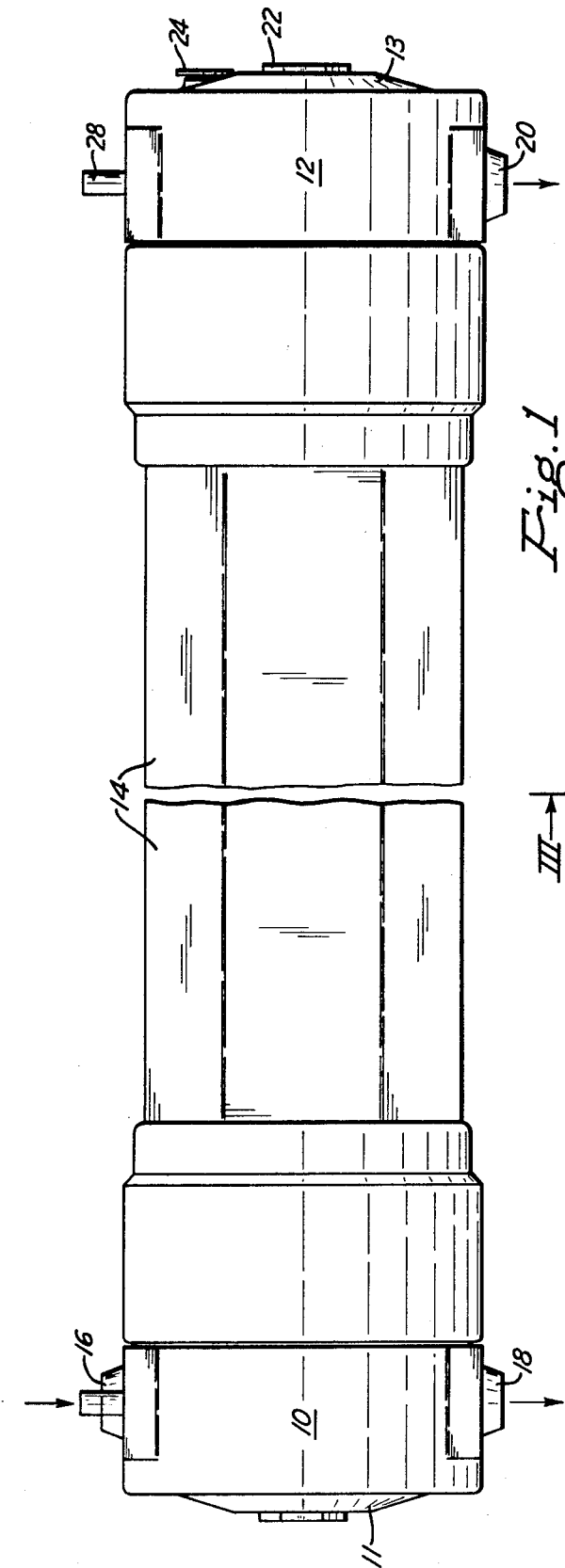
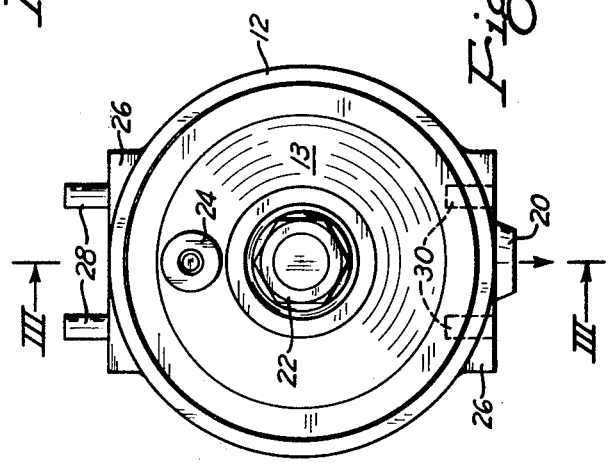
INVENTOR.
ERNEST ROBERT SAWYER
BY
William L. Krayer
ATTORNEY.

INVENTOR.
ERNEST ROBERT SAWYER
BY
William L. Krayer
ATTORNEY.

INVENTOR.
ERNEST ROBERT SAWYER
BY
William L. Krayer
ATTORNEY.

INVENTOR.
ERNEST ROBERT SAWYER
BY
*William L. Krayer*
ATTORNEY.

WELDED CONNECTORS FOR TUBULAR SEPARATOR MODULE

BACKGROUND OF THE INVENTION

This invention is primarily applicable to tubular reverse osmosis and ultrafiltration systems, which will be referred to collectively herein as "permeability separators." It is particularly applicable to the type of permeability separator disclosed by Havens in U. S. Pat. No. 3,457,170. However, it is also applicable to any tubular permeability separator in which porous tubes are coated more or less evenly throughout the internal surface with a permeable membrane, and in which a plurality of such tubes must be connected through a header providing turn-arounds.

A difficult problem presented by such turn-arounds has been the connection of the tubes to the turn-arounds in such a way that erosion of the membrane on the internal surface of the tube is prevented. In many conventional designs for such connections and turn-arounds, the turbulence of the liquid to be treated in making the turn-around is greatly accelerated and will tend to erode away the membrane. As soon as even a small area of membrane is eroded away, the effectiveness of the tube as a molecular or other separator is destroyed.

Another problem caused by the conventional header and turn-around has been evident in the assembly of the conventional module using the header and a plurality of tubes. Most such modules are assembled by hand, sometimes with the aid of special devices for alignment of the tubes; during the process of alignment, it has been relatively common for the operator unwittingly to connect the tubes in the wrong turn-arounds. Obviously, the route followed by the solution treated in a reverse osmosis or ultrafiltration module is necessarily a definite and prescribed route. When turn-arounds are installed individually, the proper alignment and sequence of the turn-arounds can be time-consuming and inefficient. The use of individual turn-arounds which are placed by means of a disk having holes drilled in it, or by other means has proven to be quite costly and relatively inefficient. Although a header or "circular wall" of the type used by Havens in U. S. Pat. No. 3,457,170 has been successfully used, it too has proven to have too many parts which leads to breakdowns and inefficiency.

For other examples of construction of headers and turn-around routes, the reader is referred to the following U. S. patents: Wallach, U. S. Pat. No. 2,386,826; Zender, U. S. Pat. No. 2,411,238; Kollsman, U. S. Pat. No. 2,987,472; Newcomb, U. S. Pat. No. 2,353,489; Mahon, U. S. Pat. No. 3,228,876; McCormack, U. S. Pat. No. 3,246,764; Clark, U. S. Pat. No. 3,430,770; and Manjikian, U. S. Pat. No. 3,485,374. The last mentioned patent, to Manjikian, illustrates a header cast in two parts—an end flange and an end plate. The end plate includes turn-arounds which, however, are not adapted to receive the membrane containing tube. Such end plates are difficult to cast because of the integral turn-arounds, and are also difficult to align correctly, particularly where a strain rod is used to connect the headers.

SUMMARY OF THE INVENTION

My invention provides an integral header for a tubular permeability separator, which is unitary and simple in design. It may be cast from any suitable plastic material, it is adapted to receive tubes and seals for them in a single operation, and permits little or no error in assembly.

In a typical assembly, the module built with two headers will have eighteen tubes, one header including the feed input and feed exit, while the other may be used for collection of the permeate. The two headers are necessarily different in the design of their turn-arounds; nevertheless the product head is biaxially symmetrical so that it may be rotated 180° before connection. It is not, however, connectable at any other angle.

Referring now to the drawings,

FIG. 1 is a side elevational view of a completed tubular module assembly having a shroud and two headers.

FIG. 2 is an elevational view of the product end header.

Figure 3:
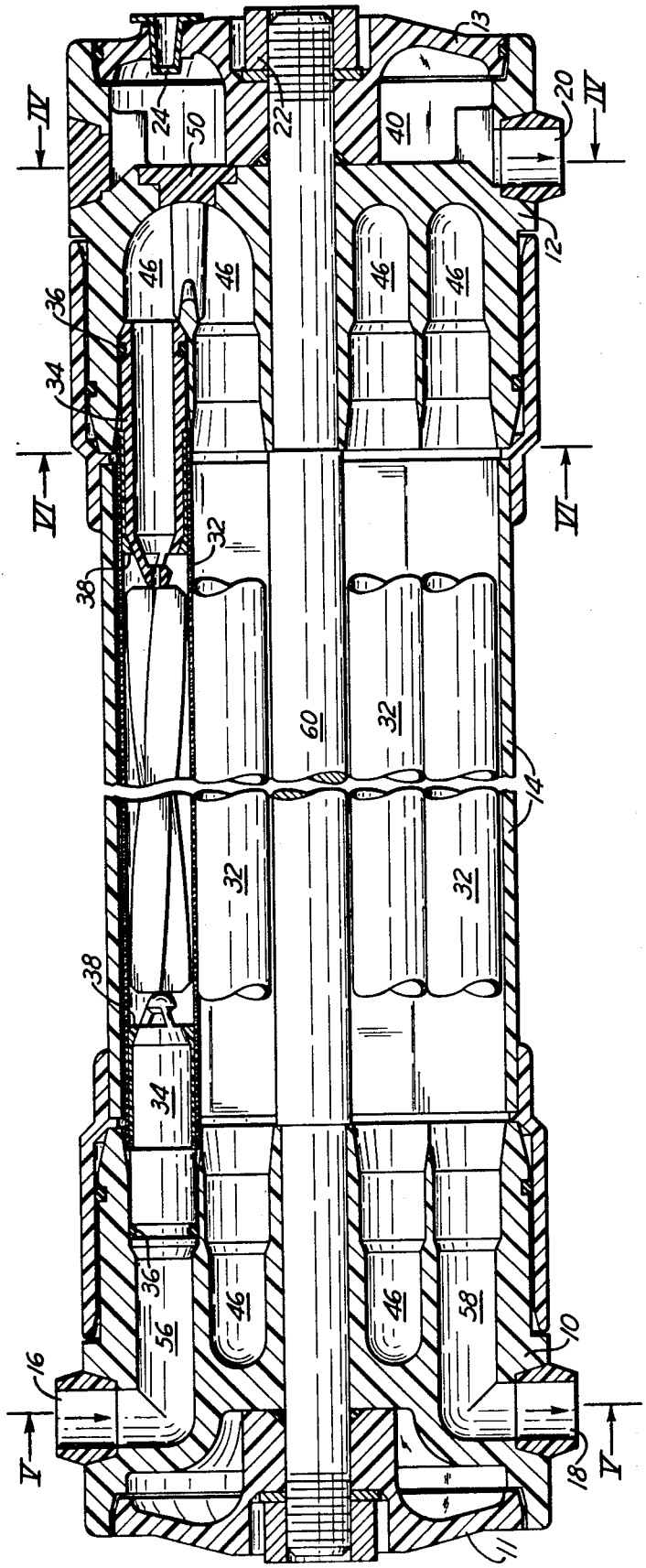
FIG. 3 is a side sectional view of the assembled module including headers.

In detail, FIG. 1 shows a completed module as it appears from the outside. It has a pressure head 10 and a product head 12 connected by a sealed shroud 14, shown to be generally hexagonal in shape. The shroud 14 is typically almost seven feet long (an entire standard module is about 80 inches long). The pressure head 10 contains an input port 16 and an output port 18. Permeate product is drawn out through port 20. Caps 11 and 13 cover the ends of the heads.

The product end of the module is shown in FIG. 2. This view illustrates the central position of the adjuster nut 22 for an axial strain rod, cap 24 for a flush port, and upper and lower shoulders 26 having upper prongs 28 and lower receptacles 30 for stacking modules.

FIG. 3, a side sectional view taken as shown at III on FIG. 2, shows the connection between pressure head 10 and cap 11, and product head 12 to cap 13. The two heads are connected by tubular membrane supports 32 passing from one to the other. The tubes 32 are connected at the headers with the aid of adapters 34, O-rings 36, and sleeves 38 as described in detail in my patent application filed together with this application, entitled "Connector for Use in Permeability Separation Devices," the disclosure of which is incorporated by reference.

The tubes 32 are fiber glass reinforced resin-impregnated tubes designed to be relatively permeable and to support a semipermeable membrane such as are used in Havens U. S. Pat. No. 3,547,170. Permeate passing through the walls of tubes 32 is drawn through the module and through transverse holes in the header to collecting chamber leading to permeate exit port 20. A strain rod 60 communicates with both headers.

Feed solution is run into the module at input port 44. Under pressure, the feed solution passes through the first semipermeable tube 32 to a turn-around 46, where it is redirected back to the pressure head. It then is reversed again in a turn-around (as further illustrated in FIG. 7). During the various passes through the tubes, permeable substances, usually water, are forced through the membrane wall on the internal surface of the tube and through the support tube wall to be collected as permeate in chamber 40.

Figure 4:
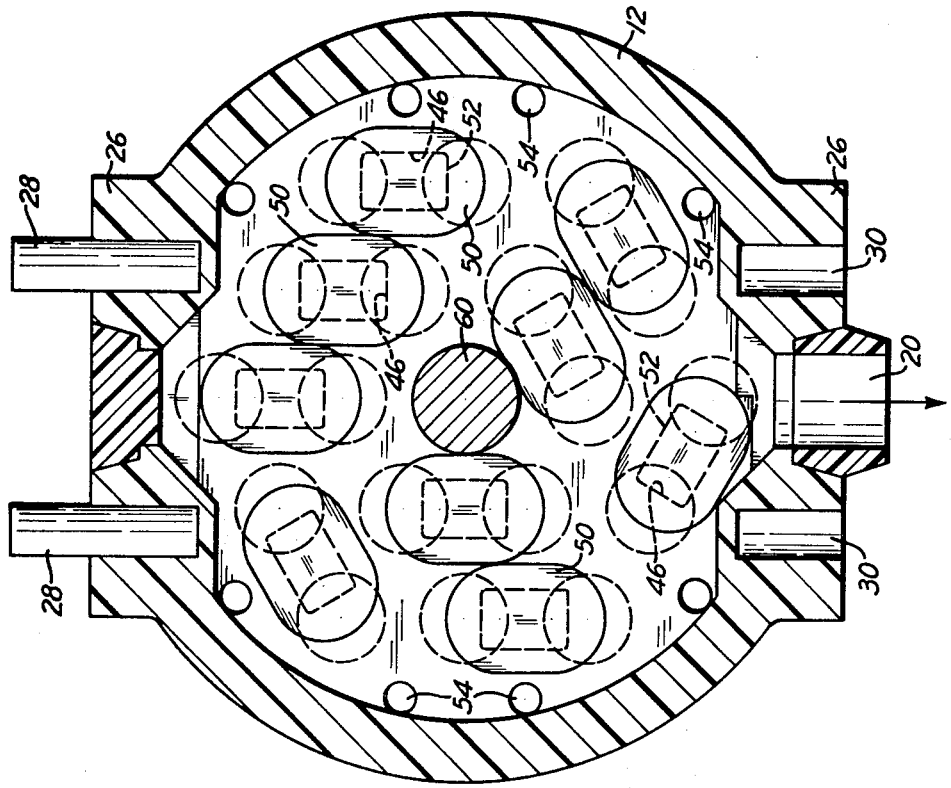
FIG. 4 is a sectional view of the product end header shown in FIG. 2.

FIG. 4 shows an end view of the permeate header. Turn-arounds 46 are capped with plugs 50 tapped into a roughly rectangular hole 52 and sonically welded. Also seen in this view of the product header are port 20 and transverse permeate collecting holes 54. Prongs 28 are seen to be capable of fitting in the receptacles 30 of an adjacent module.

Figure 5:
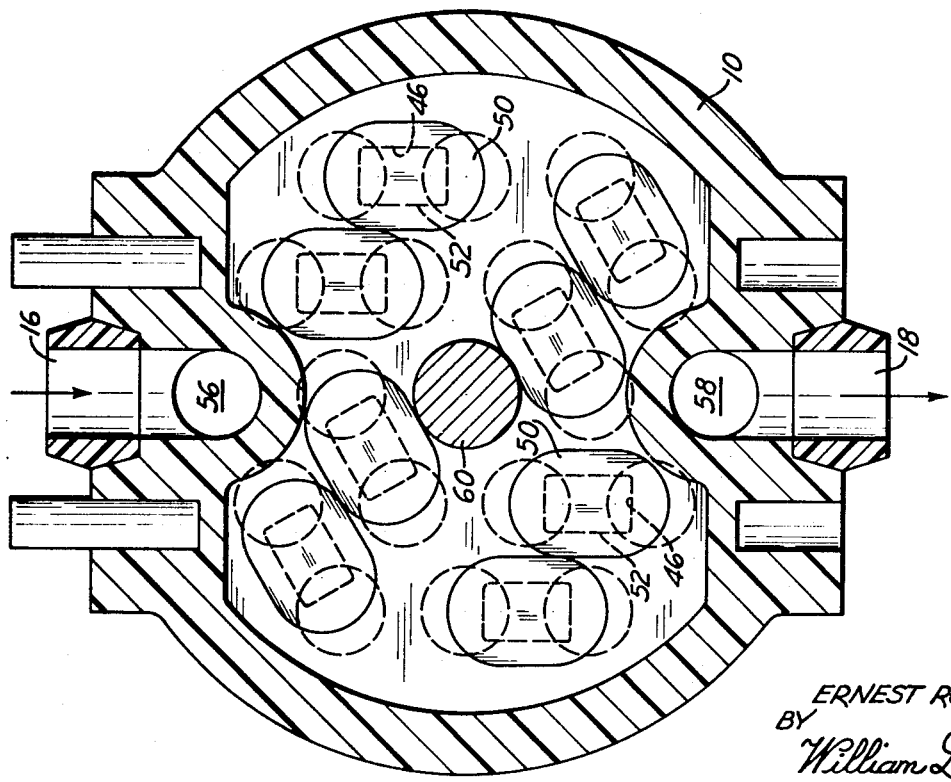
FIG. 5 is a sectional view of the pressure end header.

It will be observed from a comparison of the pressure head (FIG. 5) with the product head that the orientation of the turn-arounds 46 is different. To provide a continuous course through eighteen tubes, the turn-arounds must necessarily be oriented differently; in addition, however, my headers are constructed to be nonsymmetrical. The input 56 for the pressure head is at the top; the exit 58 is at the bottom. Strain rod 60 is shown in the headers.

Figure 6:
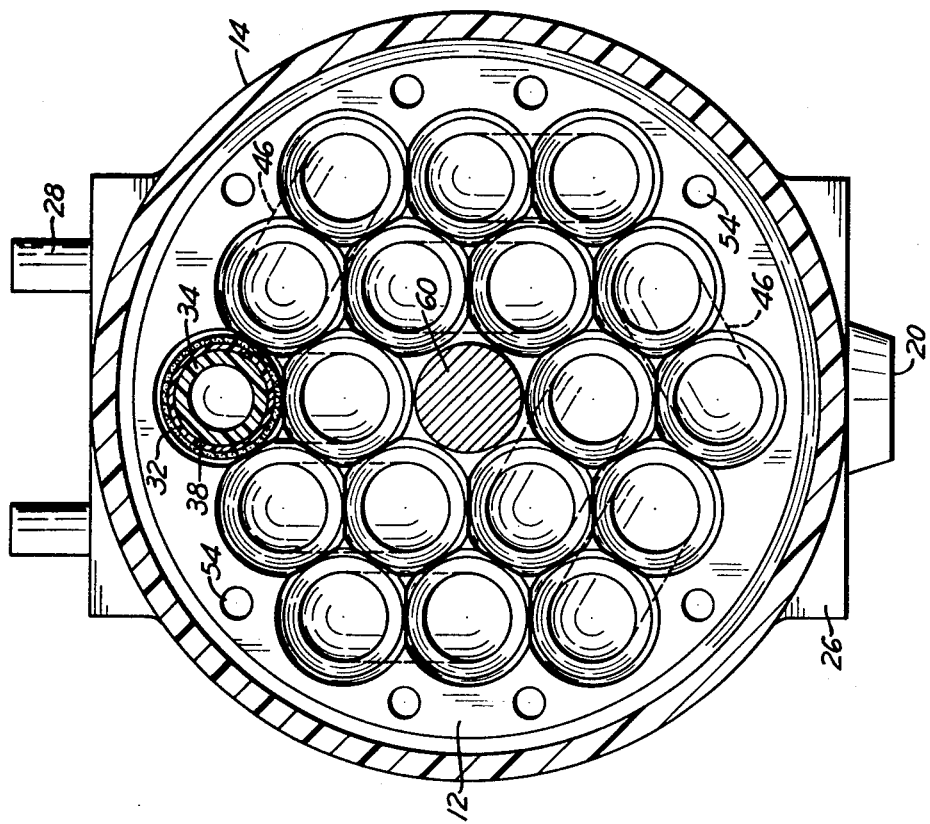
FIG. 6 is a section taken at VI of FIG. 3, showing the inside face of the product header.

In FIG. 6, a cross section through the module is shown taken at VI of FIG. 3. Adapters 34 are seen positioned within tubes 32. Strain rod 60 passes through the center of the tube array. Permeate collecting holes 54 also appear in this section as in FIG. 4. The orientation of turn-arounds 46 is shown by dotted lines. Shroud 14 encloses the header as a continuous unit.

Figure 7:
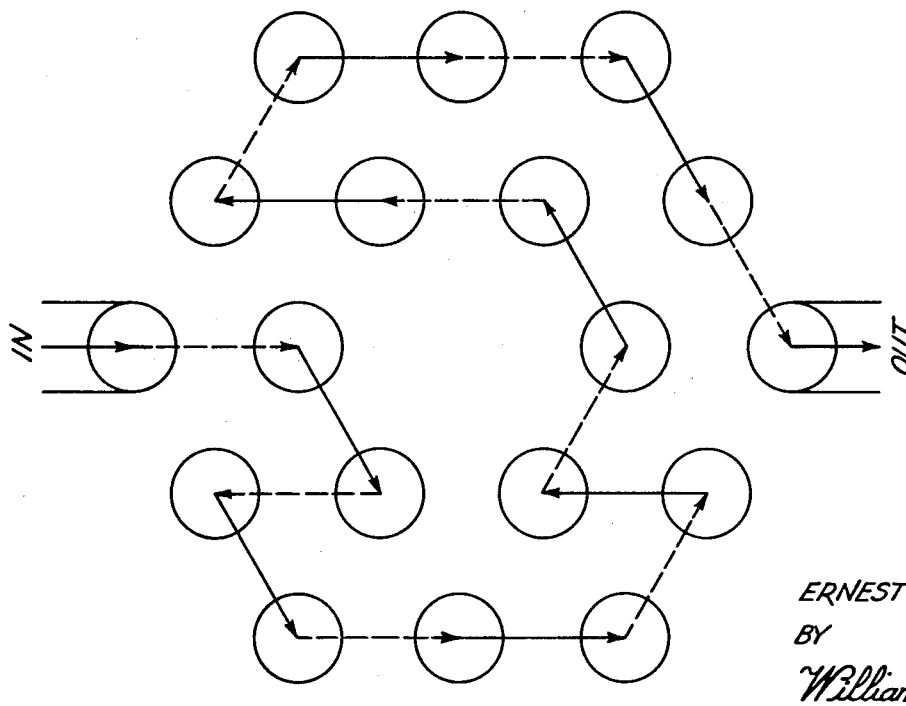
FIG. 7 is a diagrammatic illustration of the route of the feed solution through the tubes of the permeability separator module.

FIG. 7 illustrates the route of the feed solution, viewed from the pressure head, the dotted lines representing the turn-arounds in the product head and the solid lines the turn-arounds at the pressure head. It may be observed that no fixed rule of routing the concentrate is followed. The preferred course is asymmetrical.

I claim:

1. A unitary header for a tubular permeability separator module, comprising a solid cast body having a plurality of pairs of holes therethrough, each pair connected by a sonic welded plug providing communication between the holes at the exterior ends of the header.

2. A permeability separator module including two unitary headers having pairs of holes communicating through sonic welded plugs, the pairs of holes connected sequentially through permeable tubes, a shroud surrounding the permeable tubes and connected in sealed relation to the headers, and means for withdrawing permeate from the module.

3. A module of claim 2 including tubular adapters for engaging the ends of said permeable tubes in sealed relation to the headers.

4. Module of claim 2 in which the means for withdrawing permeate are in one header, and the means for introducing feed solution and withdrawing feed concentrate are in the other header.

* * * * *